United States Patent
Ikeda et al.

(10) Patent No.: US 10,616,432 B2
(45) Date of Patent: Apr. 7, 2020

(54) IMAGE FORMING APPARATUS AND METHOD FOR CONTROLLING THE SAME WHICH INCLUDES AT LEAST ONE OR MORE PROCESSORS, AND MEMORY STORING INSTRUCTIONS TO DETERMINE WHETHER TO PERFORM IMAGE FORMATION, AND TO PERFORM OPERATIONS FOR CONTROLLING EXECUTION OF DEW CONDENSATION ELIMINATION PROCESSING HAVING OCCURRED IN THE IMAGE FORMING UNIT

(71) Applicant: CANON KABUSHIKI KAISHA, Tokyo (JP)

(72) Inventors: Atsushi Ikeda, Toride (JP); Hikaru Sugita, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/652,050

(22) Filed: Jul. 17, 2017

(65) Prior Publication Data
US 2018/0027140 A1    Jan. 25, 2018

(30) Foreign Application Priority Data

Jul. 25, 2016 (JP) .................................. 2016-145741
Dec. 20, 2016 (JP) .................................. 2016-247180

(51) Int. Cl.
*H04N 1/00*    (2006.01)
*H05K 7/20*    (2006.01)

(52) U.S. Cl.
CPC ..... *H04N 1/00925* (2013.01); *H04N 1/00981* (2013.01); *H04N 1/00992* (2013.01); *H04N 2201/0094* (2013.01)

(58) Field of Classification Search
USPC .............................. 358/1.1–3.29, 1.11–1.18
See application file for complete search history.

(56) References Cited

U.S. PATENT DOCUMENTS 4,905,092 A * 2/1990 Koshiishi ........... H04N 1/00795
                                                    347/233
6,408,144 B2 * 6/2002 Sasai .................. H04N 1/00015
                                                    399/44

(Continued)

FOREIGN PATENT DOCUMENTS

CN          1664648 A      9/2005
CN        102053541 A      5/2011

(Continued)

*Primary Examiner* — Marcellus J Augustin
(74) *Attorney, Agent, or Firm* — Canon U.S.A., Inc. IP Division

(57) ABSTRACT

An image forming apparatus includes an image forming unit, one or more processors, and memory storing instructions that, when executed by the one or more processors, cause the image forming apparatus to perform operations. The image forming unit forms an image on a sheet. The operations include controlling execution of dew condensation elimination processing that is processing for eliminating dew condensation having occurred in the image forming unit. The operations additionally include receiving image data to be printed and restricting, based on a type of a job executed using the received image data, image forming by the image forming unit, in a case where the dew condensation elimination processing is in execution.

20 Claims, 12 Drawing Sheets

(56) References Cited

U.S. PATENT DOCUMENTS

| | | | |
|---|---|---|---|
| 9,454,113 B2* | 9/2016 | Kuwata | G03G 15/234 |
| 2003/0111218 A1* | 6/2003 | Iguchi | H04N 1/00127 |
| | | | 165/200 |
| 2005/0286092 A1* | 12/2005 | Choi | H04N 1/00986 |
| | | | 358/474 |
| 2012/0076561 A1 | 3/2012 | Sato | |
| 2013/0027755 A1* | 1/2013 | Yamauchi | G03G 15/55 |
| | | | 358/406 |
| 2015/0116757 A1 | 4/2015 | Suzuki | |

FOREIGN PATENT DOCUMENTS

| | | | | |
|---|---|---|---|---|
| JP | S63-178654 A | | 7/1988 | |
| JP | 2000151866 A | * | 5/2000 | H04N 1/00 |
| JP | 2000209415 A | | 7/2000 | |
| JP | 2003018370 A | | 1/2003 | |
| JP | 2005039477 A | | 2/2005 | |
| JP | 2012-103532 A | | 5/2012 | |

\* cited by examiner

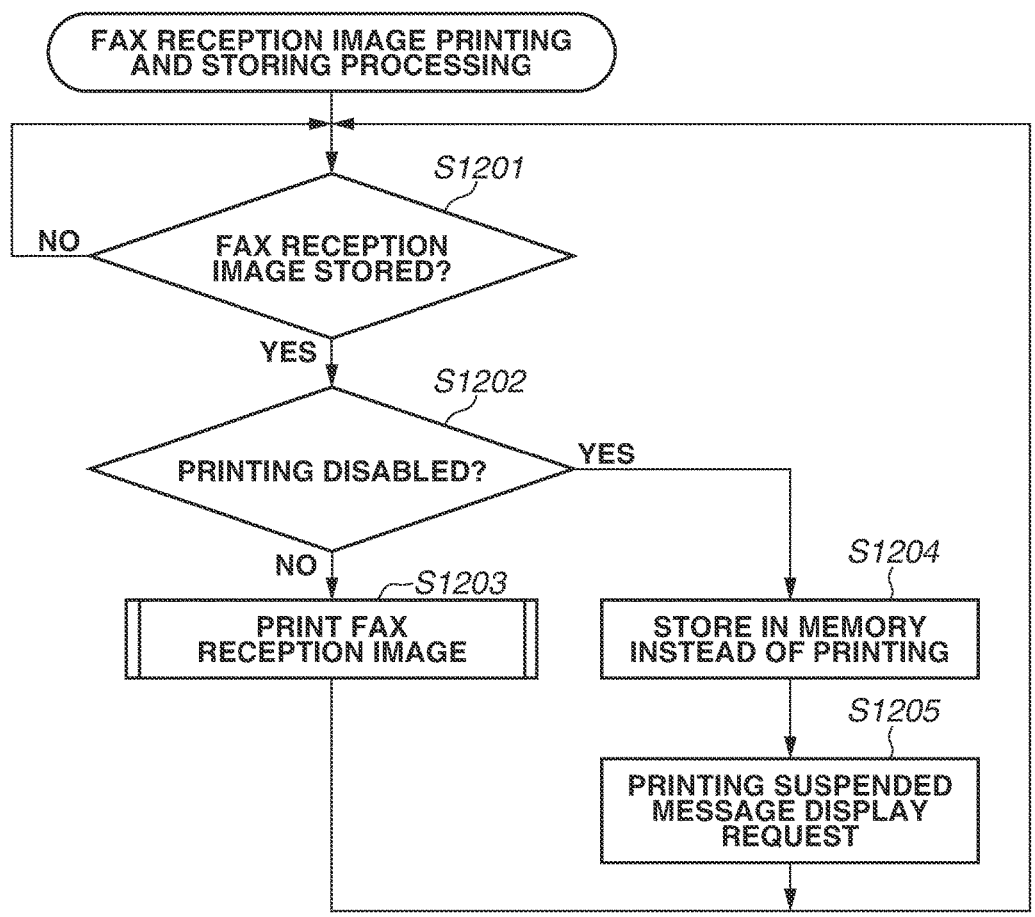

IMAGE FORMING APPARATUS AND METHOD FOR CONTROLLING THE SAME WHICH INCLUDES AT LEAST ONE OR MORE PROCESSORS, AND MEMORY STORING INSTRUCTIONS TO DETERMINE WHETHER TO PERFORM IMAGE FORMATION, AND TO PERFORM OPERATIONS FOR CONTROLLING EXECUTION OF DEW CONDENSATION ELIMINATION PROCESSING HAVING OCCURRED IN THE IMAGE FORMING UNIT

BACKGROUND OF THE INVENTION

Field of the Invention

The disclosed information relates to an image forming apparatus employing electrophotographic method.

Description of the Related Art

Dew condensation sometimes occurs in an electrophotographic image forming apparatus due to a change in an environment in which the apparatus is installed, for instance, when a temperature around the apparatus changes. The dew condensation in the apparatus may cause an error during image forming, or may result in an image formed with a low image quality.

Japanese Patent Application Laid-Open No. 2000-209415 discusses a technique in which data received by FAX during night time involving a high risk of dew condensation is output and at the same time stored in a memory. Japanese Patent Application Laid-Open No. 2005-39477 discusses a technique in which a dew condensation prevention heater is heated when a high voltage output sharply changes during image forming due to dew condensation.

The apparatuses discussed in both Japanese Patent Application Laid-Open No. 2000-209415 and Japanese Patent Application Laid-Open No. 2005-39477 execute image forming processing even under a risk of outputting an image with a low image quality due to the occurrence of the dew condensation. Thus, the image quality of an output of the image forming cannot be guaranteed when the printing is performed in such a condition.

SUMMARY OF THE INVENTION

The disclosed information is directed to an image forming apparatus capable of guaranteeing an image quality of a printed image, by restricting execution of an image forming operation under a risk of outputting an image with a low image quality due to dew condensation occurring in an image forming apparatus. An example of such a condition includes a condition where dew condensation elimination processing is in execution.

According to an aspect of the present invention, an image forming apparatus includes an image forming unit configured to form an image on a sheet, one or more processors, and memory storing instructions that, when executed by the one or more processors, cause the image forming apparatus to perform operations including: controlling execution of dew condensation elimination processing that is processing for eliminating dew condensation having occurred in the image forming unit, receiving image data to be printed, and restricting, based on a type of a job executed using the received image data, image forming by the image forming unit, in a case where the dew condensation elimination processing is in execution.

Further features of the present invention will become apparent from the following description of embodiments with reference to the attached drawings.

BRIEF DESCRIPTION OF THE DRAWINGS

FIG. 12 is a flowchart illustrating FAX reception image printing and storing processing according to a fourth embodiment.

DESCRIPTION OF THE EMBODIMENTS

Embodiments will be described below with reference to the drawings. The embodiments are not intended to limit the scope of the invention set forth in the claims. Not all combinations of features described in the embodiments are required for the solution provided by the invention.

A First Embodiment Will be Described.

Figure 1:
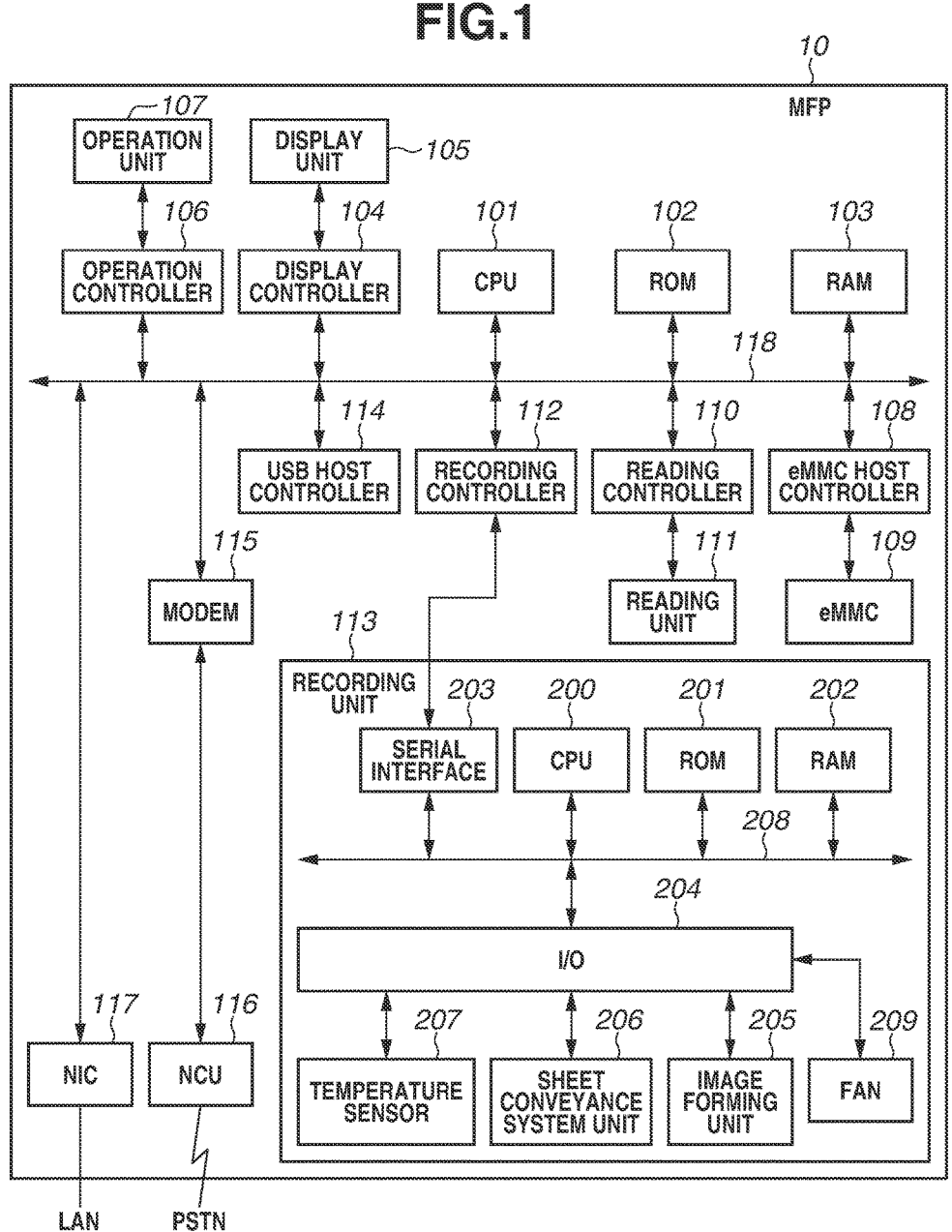
FIG. 1 is a block diagram illustrating an example of a hardware configuration of a multifunction peripheral (MFP) according a first embodiment.

FIG. 1 is a block diagram illustrating an example of a hardware configuration of a multi-function peripheral (MFP) according to the first embodiment.

As illustrated in FIG. 1, an MFP 10 includes a central processing unit (CPU) 101, a read only memory (ROM) 102, a random access memory (RAM) 103, a display controller 104, a display unit 105, an operation controller 106, and an operation unit 107. The MFP 10 further includes an embedded Multi Media Card (eMMC) host controller 108, an eMMC 109, a reading controller 110, a reading unit 111, a recording controller 112, and a recording unit 113. The MFP 10 further includes a universal serial bus (USB) host controller 114, a modem 115, a network control unit (NCU) 116, and a network interface card (NIC) 117.

The CPU 101 controls the devices connected to a system bus 118. Upon receiving power supply, the CPU 101 executes a boot program stored in the ROM 102. The CPU 101 executes the boot program, then loads a main program stored in the eMMC 109 serving as a storage, onto the RAM 103, and jumps to the top of the main program thus loaded. The RAM 103 not only functions as an area onto which the main program is loaded, but also functions as a work area for the main program.

The display controller 104 controls rendering on the display unit 105. The display unit 105 is a liquid crystal display (LCD) that can display a character string of 28 characters×seven lines, ruled lines, and a scrollbar. The operation controller 106 receives an operation input through the operation unit 107 of the MFP 10. The operation unit 107 includes numeric keypads, cursor keys, and a one-touch key.

The reading unit 111 reads a document. The reading unit 111 may include a document feeder. The reading unit 111 including the document feeder can automatically read a plurality of documents. The reading unit 111 is connected to the reading controller 110. The CPU 101 transmits and receives data to and from the reading unit 111, via the reading controller 110.

The recording unit 113 performs printing (image forming) on a sheet based on electrophotography. The recording unit 113 is connected to the recording controller 112. The CPU 101 transmits and receives data to and from the recording unit 113 via the recording controller 112.

The USB host controller 114 controls a USB protocol, and mediates access to a USB device such as a USB memory (not illustrated).

The modem 115 performs signal encoding/decoding required for facsimile (FAX) communications. The modem 115 is connected to the NCU 116. The signal encoded by the modem 115 is transmitted to a Public Switched Telephone Network (PSTN) via the NCU 116.

The NIC 117 transmits and receives data to and from a mail server, a file server, a client terminal, and the like via a local area network (LAN). The LAN according to the first embodiment may be established by Ethernet (registered trademark), and may be a wireless network supporting IEEE802.11.

The MFP 10 according to the present embodiment includes the eMMC 109 as a storage. The CPU 101 accesses the eMMC 109 via the eMMC host controller 108. A solid state drive (SSD) or a hard disk may be used instead of the eMMC 109.

The recording unit 113 includes a CPU 200, a ROM 201, a RAM 202, and a serial interface 203. The recording unit 113 further includes an I/O 204, an image forming unit 205, a sheet conveyance system unit 206, and a temperature sensor 207.

Upon receiving power supply, the CPU 200 executes a recording unit control program stored in the ROM 201. The RAM 202 functions as a work area for the recording unit control program. The CPU 200 receives various commands issued by the main program of the MFP 10 via the serial interface 203, and controls the image forming unit 205 and the sheet conveyance system unit 206 via the I/O 204 connected to a system bus 208, in accordance with the received various commands. Furthermore, the CPU 200 can acquire a temperature measurement result from the temperature sensor 207 via the I/O 204.

The image forming unit 205 employs electrophotography to form an image on a sheet conveyed thereto with the sheet conveyance system unit 206. The temperature sensor 207 is disposed, for example, close to the image forming unit 205 in the MFP 10, and measures a temperature at a portion close to the image forming unit 205 as an environmental temperature in the MFP 10. A fan 209 discharges air inside the MFP 10 so that an airflow is created in the MFP 10, whereby a difference between temperatures inside and outside the MFP 10 can be reduced.

Figure 2:
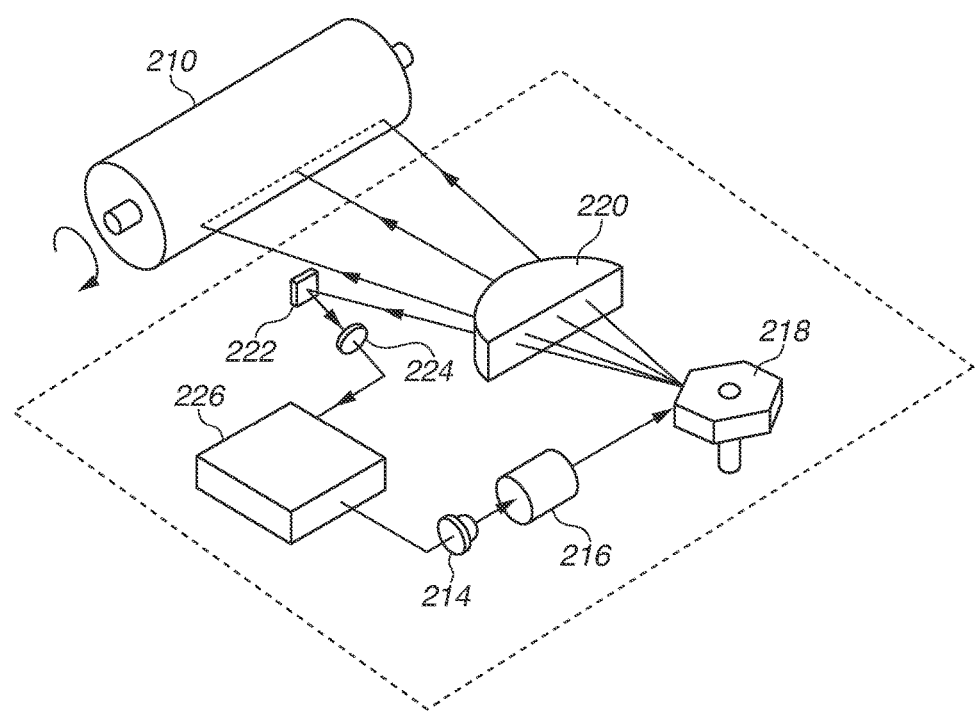
FIG. 2 is a diagram illustrating an example of an appearance of an optical scanning system in an image forming unit.

FIG. 2 is a diagram illustrating an example of an appearance of an optical scanning system in the image forming unit 205. A laser driving system circuit 226 supplies driving current to a semiconductor laser 214 serving as a light emitting element. The semiconductor laser 214 emits a laser beam in an amount corresponding to the driving current. The laser beam emitted by the semiconductor laser 214 is collimated by a collimator lens 216 to be a collimated beam. Then, this beam is reflected by a rotating polygon mirror 218 to be scanned on an fθ lens 220. With the fθ lens 220, the scanned laser beam forms an image on a surface of the photosensitive drum 210 rotating around a shaft thereof, in such a manner that the photosensitive drum 210 is scanned by the beam in a horizontal direction.

A reflection mirror 222 is provided at a position corresponding to a scanning position on one end side of the photosensitive drum 210, and reflects the laser beam emitted onto a scanning start position to a beam detect (BD) element (synchronization signal detection element) 224. A timing at which the scanning with the laser beam starts is determined based on an output from the BD element 224.

When dew condensation is generated on the photosensitive drum 210, the electrophotographic image forming is hindered, and thus the image sometimes cannot be formed appropriately. In such a case, a quality of an image formed on the sheet cannot be maintained. When dew condensation is generated on the BD element 224, the BD element 224 might not be able to detect a laser beam. In such a case, the laser beam scanning start timing cannot be determined, and thus the MFP 10 falls in an error state.

Figure 3:
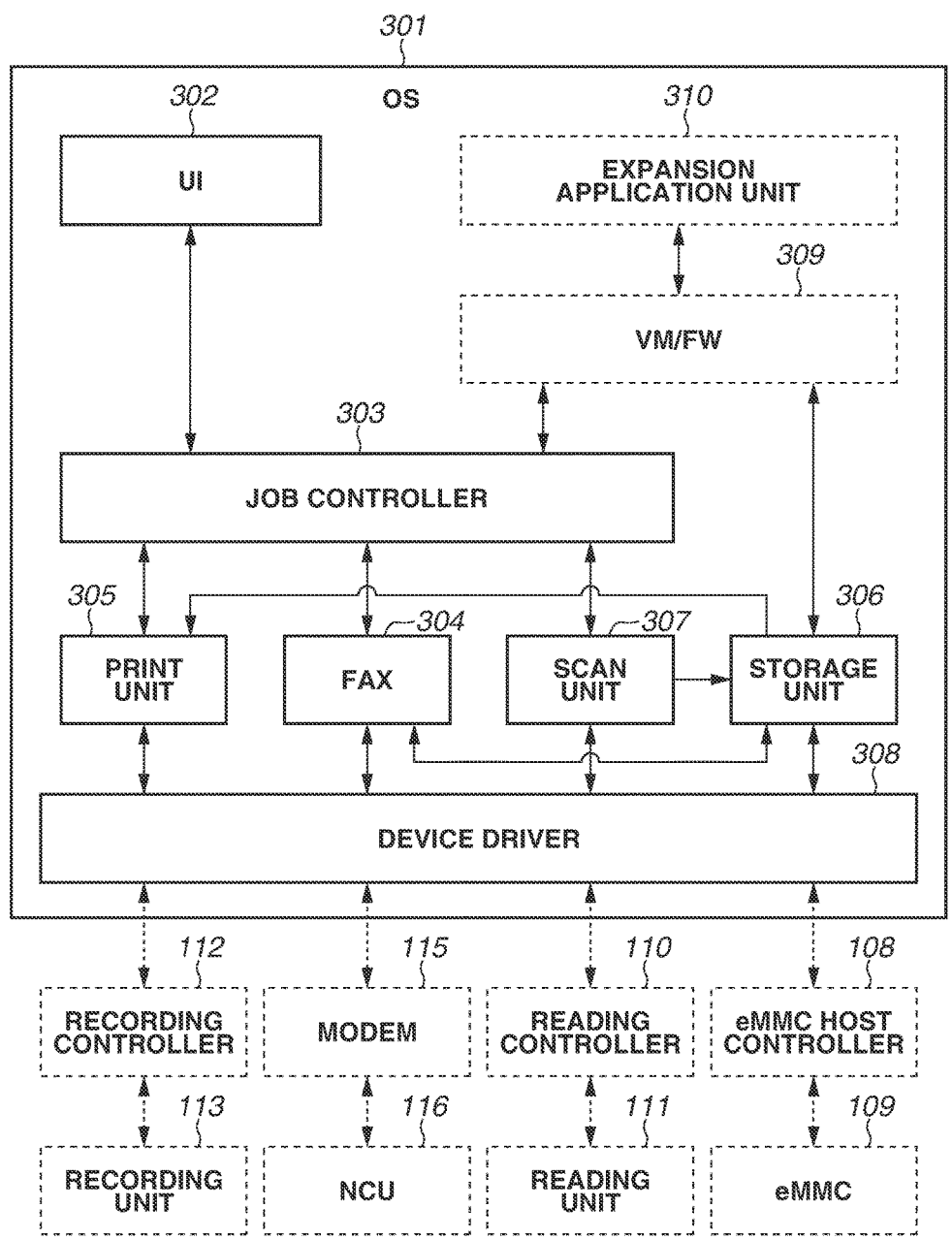
FIG. 3 is a block diagram illustrating an example of a software configuration of the MFP according to the first embodiment.

FIG. 3 is a block diagram illustrating an example of a software configuration of the MFP 10 according to the first embodiment. Components illustrated with solid lines in FIG. 3 are software modules implemented by executing the main program loaded onto the RAM 103 by the CPU 101 with the boot program.

The modules described below, implemented with the main program, is managed and controlled by an operating system (OS) 301. A device driver 308 is combined with the OS 301. The device driver 308 mediates transactions with hardware devices such as the recording controller 112 and the modem 115.

A user interface (UI) 302 provides various types of information to a user via the display unit 105 and the operation unit 107, and receives various instructions from the user.

A job controller 303 receives jobs such as copy, print, and FAX, and controls execution of the received job.

A storage unit 306 is a software module that physically stores and manages data, such as an image transmitted or received by FAX and user settings, in the eMMC 109.

When the job controller 303 receives a FAX job, a scan unit 307 receives this job request and scans the document by controlling the reading unit 111. Then, FAX image data obtained by the scanning is stored in the storage unit 306. The FAX image data stored in the storage unit 306 is read out by a FAX unit 304, and is transmitted by FAX to a counterpart via the modem 115 and the NCU 116. The FAX unit 304 acquires image data received by FAX from the counterpart via the modem 115 and the NCU 116, and stores the image data in the storage unit 306.

A print unit 305 transmits various predetermined commands to the recording unit 113 via the recording controller 112, and receives a status of the recording unit 113 to control operations of the recording unit 113. For example, when printing a FAX reception image, after transmitting a print command to the recording unit 113, the print unit 305 reads out an image file stored in the storage unit 306 and transfers image data in the image file to the recording unit 113.

The MFP 10 includes a virtual machine (VM)/framework (FW) 309. An expansion application unit 310 includes a certain program written in a script language.

Figure 4:
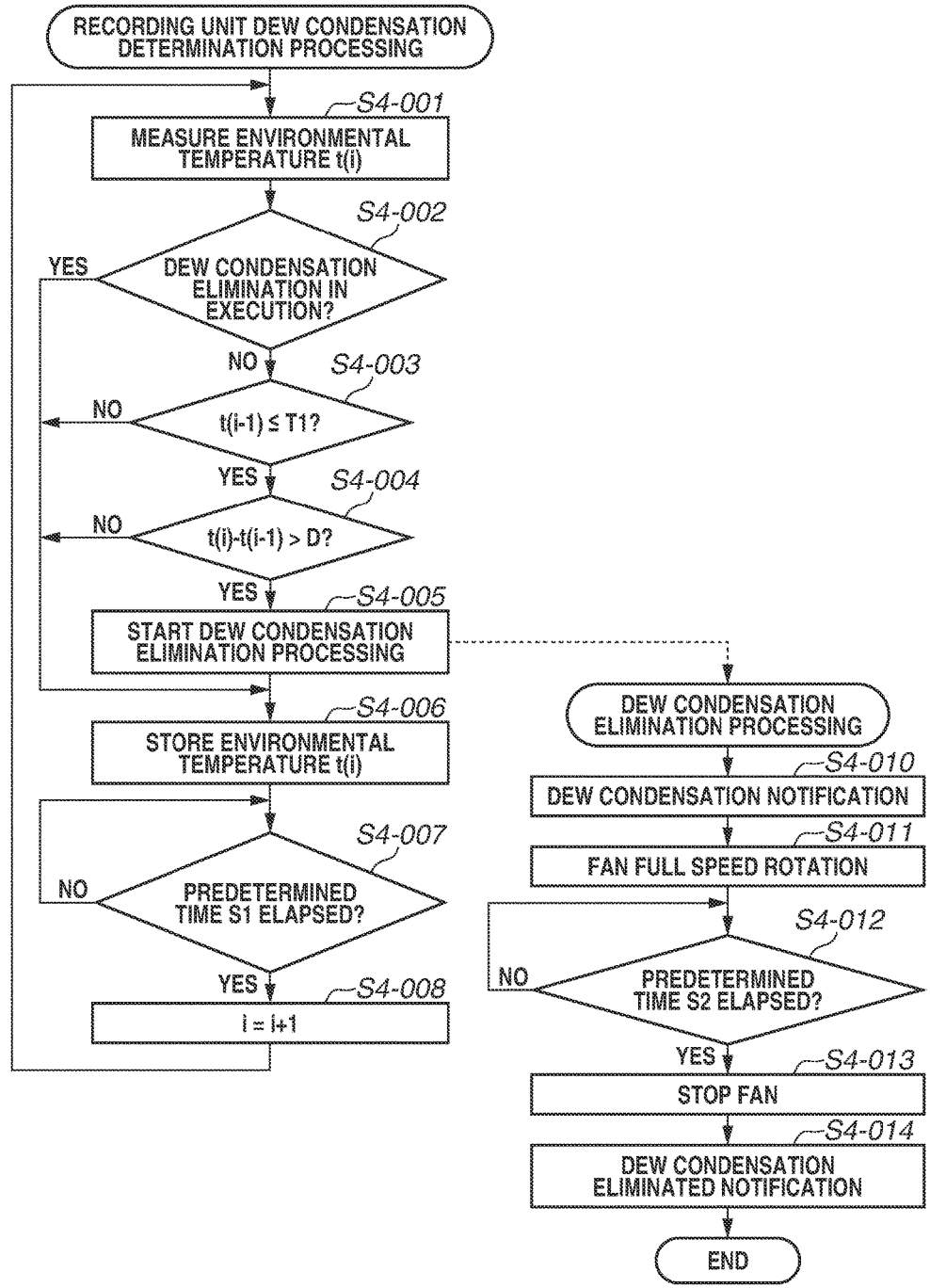
FIG. 4 is a flowchart illustrating an example of dew condensation determination processing and dew condensation elimination processing according to the first embodiment.

FIG. 4 is a flowchart illustrating an example of operations in dew condensation determination processing and dew condensation elimination processing executed by the recording unit 113 according to the first embodiment. For example, the processing in FIG. 4 may be executed when the MFP 10 is set to operate in a dew condensation elimination mode by user. For example, the user can turn ON/OFF the dew condensation elimination processing via the operation unit 107. The content of the user setting is stored in the eMMC 109 or the like. The flowchart illustrated in FIG. 4 is executed when a dew condensation elimination processing is ON.

The dew condensation determination processing from steps S4-001 to S4-008 is a part of the recording unit control program, described with reference to FIG. 2, which is automatically executed when the CPU 200 of the recording unit 113 receives power supply. Alternatively, the CPU 101 may execute a program to cause the CPU 200 to execute the dew condensation determination processing from steps S4-001 to S4-008.

First of all, in step S4-001, the CPU 200 acquires an environmental temperature t(i) in the MFP 10 as a measurement result from the temperature sensor 207 illustrated in FIG. 2. In this embodiment, the environmental temperature is, for example, a temperature in the MFP10. Then, in step S4-002, the CPU 200 determines whether the dew condensation elimination processing is in execution. When the dew condensation elimination processing (described below) is not in execution (NO in step S4-002), the processing proceeds to step S4-003. On the other hand, when the dew condensation elimination processing is in execution (YES in step S4-003), the processing proceeds to step S4-006.

In step S4-003, the CPU 200 determines whether an environmental temperature t(i−1) measured at a point earlier than the current point by a predetermined time S1 described below is equal to or lower than a predetermined temperature T1. The environmental temperature t(i−1) is stored in the RAM 202, and is read out from the RAM 202 in step S4-003. If the environmental temperature t(i−1) is equal to or lower than the predetermined temperature T1 (YES in step S4-003), the processing proceeds to step S4-004. On the other hand, when the environmental temperature t(i−1) is higher than the predetermined temperature T1 (NO in step S4-003), the processing proceeds to step S4-006. The processing proceeds from step S4-003 to step S4-006 also in a situation where the environmental temperature measured at the point earlier than the current point by the predetermined time S1 cannot be obtained. An example of such a situation includes a timing immediately after the MFP 10 has started.

In step S4-004, the CPU 200 determines whether a difference between the environmental temperature t(i) acquired in step S4-001 and the environmental temperature t(i−1) measured at the point earlier than the current point by the predetermined time S1 is larger than a predetermined value D. If the difference is larger than the predetermined value D (YES in step S4-004), the processing proceeds to step S4-005. On the other hand, when the difference is not larger than the predetermined value D (NO in step S4-004), the processing proceeds to step S4-006.

Thus, the processing in step S4-005 is executed when the environmental temperature t(i−1) is determined to be equal to or lower than the predetermined temperature T1 in step S4-003, and the difference t(i)−t(i−1) is determined to be larger than the predetermined value D in step S4-004. This indicates that the temperature has risen in the MFP 10 under a relatively low temperature involving a high risk of dew condensation, meaning that the dew condensation might have occurred. In step S4-005, the CPU 200 starts the dew condensation elimination processing, and the processing proceeds to step S4-006.

In step S4-006, the CPU 200 stores the environmental temperature t(i) measured in step S4-001, in the RAM 202. Then, in step S4-007, the CPU 200 waits until the predetermined time S1 elapses. When the predetermined time S1 has elapsed (YES in step S4-007), the processing proceeds to step S4-008. In step S4-008, the CPU 200 increments i by one, and the processing returns to step S4-001. Thus, with steps S4-007 and S4-008, the environmental temperature t(i) is measured once in every predetermined time S1.

The processing carried out in steps S4-010 to S4-014 is the dew condensation elimination processing which is started by the processing in step S4-005.

First of all, in step S4-010, the CPU 200 issues a notification indicating that the dew condensation elimination processing has started (that is, the dew condensation might have occurred in the MFP 10) to the CPU 101 via the serial interface 203 (the notification is hereinafter referred to as a dew condensation elimination processing notification). The main program executed by the CPU 101 turns ON a dew condensation elimination processing flag in the RAM 202, upon recognizing reception of the dew condensation elimination processing notification. The dew condensation elimination processing flag is ON when the dew condensation elimination processing is in execution in the recording unit 113.

Then, in step S4-011, the CPU 200 causes full speed rotation of the fan 209 in the MFP10. This processing is executed to facilitate reduction of the difference between the temperatures inside and outside the MFP 10, and thus to eliminate the dew condensation having occurred in the MFP 10 and to recover from the state where the dew condensation is likely to be generated. The dew condensation elimination processing according to the first embodiment is executed by the full speed rotation of the fan 209. Alternatively, the fan 209 may rotate at a speed other than the full speed as long as the effect of eliminating the dew condensation can be achieved.

In step S4-012, the CPU 200 waits until a predetermined time S2 elapses with the fan 209 rotating. The predetermined time S2 corresponds to a duration of the full speed rotation of the fan 209 that is expected to eliminate the dew condensation in the MFP 10.

When the predetermined time S2 has elapsed (YES in step S4-012), the processing proceeds to step S4-013. In step S4-013, the CPU 200 stops the fan 209. In the case where the fan 209 was rotating at a predetermined speed before the processing in step S4-011 is executed, the CPU 200 restores the predetermined speed instead of stopping the fan 209 in step S4-013.

In step S4-014, the CPU 200 issues a notification indicating that the dew condensation elimination processing has been completed (that is, the dew condensation in the MFP 10 has been eliminated) to the CPU 101 in a similar manner to that in step S4-010. Then, the dew condensation elimination processing is terminated.

Upon receiving the notification indicating that the dew condensation elimination processing has been completed, the CPU 101 turns OFF the dew condensation elimination processing flag.

Figure 5:
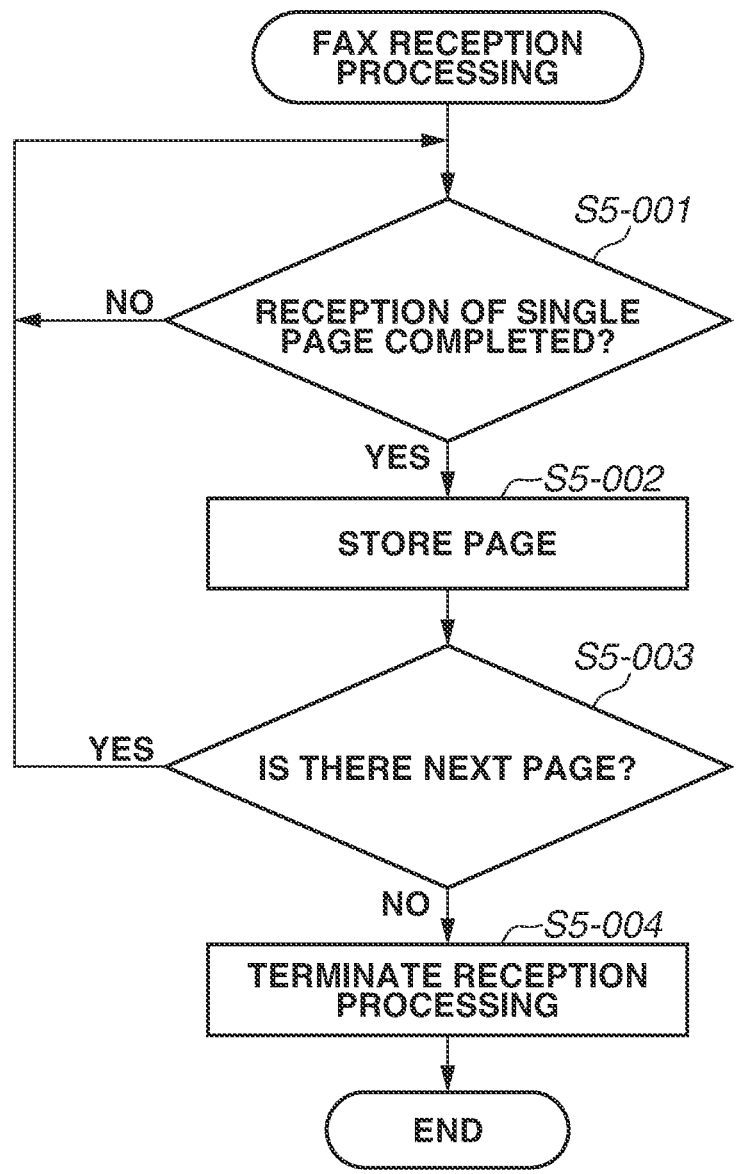
FIG. 5 is a flowchart illustrating an example of facsimile (FAX) reception processing according to the first embodiment.

FIG. 5 is flowchart illustrating an example of FAX reception processing according to the first embodiment. Steps in the flowchart illustrated in FIG. 5 are implemented by the CPU 101 through execution of the main program loaded on the RAM 103. More specifically, the flowchart is executed by part of programs that constitute the FAX unit 304. The FAX reception processing starts when FAX is received via the NCU 116 and a negotiation for a FAX reception procedure is completed.

In step S5-001, the CPU 101 waits until reception of a FAX image of a single page is completed. When reception of the FAX image of a single page is complete (YES in step S5-001), the processing proceeds to step S5-002. In step S5-002, the CPU 101 converts the received FAX image into a predetermined image format to be stored by the storage unit 306 in the eMMC 109 as an image file of a single page.

Then, in step S5-003, the CPU 101 determines whether a signal indicating that there is a subsequent page in the FAX reception procedure has been received. When there is a subsequent page (YES in step S5-003), the processing returns to step S5-001. When there is no subsequent page (NO in step S5-003), the processing proceeds to step S5-004. In step S5-004, the CPU 101 terminates the FAX reception processing.

Figure 6:
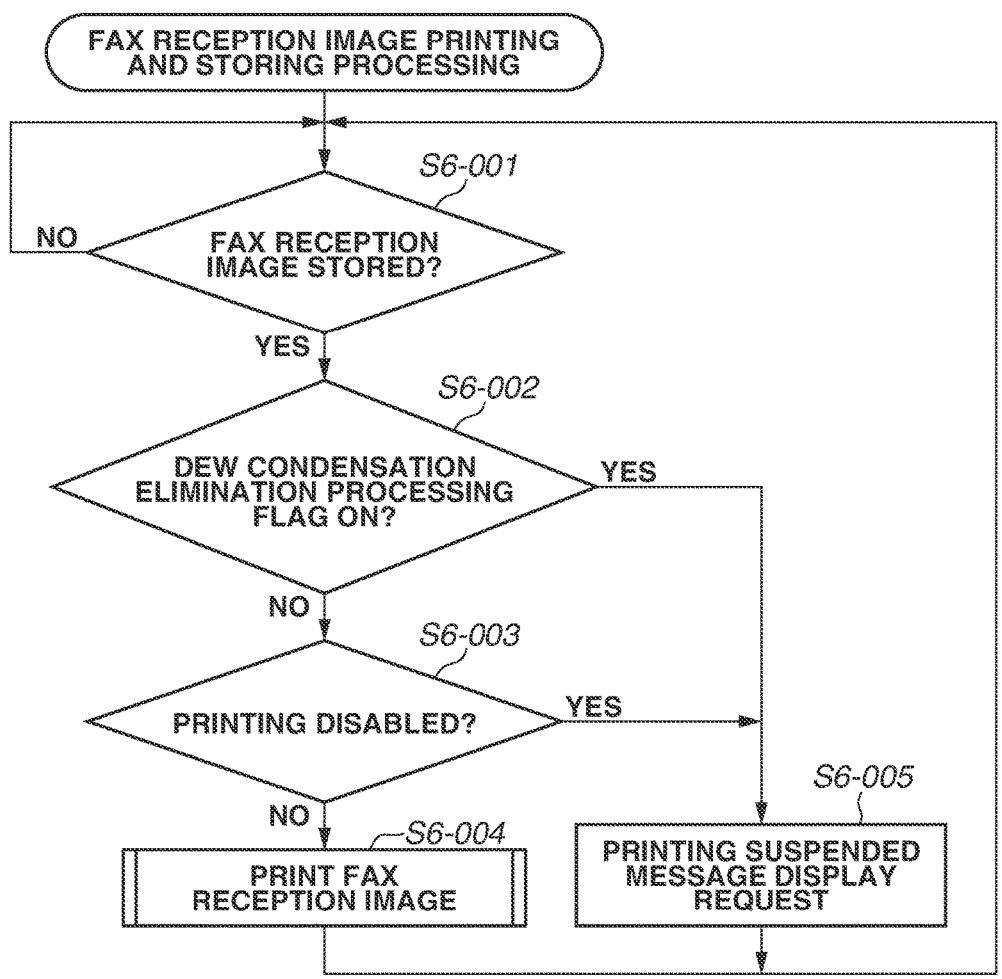
FIG. 6 is a flowchart illustrating an example of FAX reception image printing and storing processing according to the first embodiment.

FIG. 6 is a flowchart illustrating an example of FAX reception image printing and storing processing according to the first embodiment. Steps in the flowchart illustrated in FIG. 6 are implemented by the CPU 101 through execution of the main program loaded on the RAM 103. More specifically, the flowchart is executed by part of programs that constitute the print unit 305. The flowchart is automatically started after initialization processing of the main program.

In step S6-001, the CPU 101 waits for at least one FAX reception job to be generated as a result of executing the FAX reception processing in the flowchart illustrated in FIG. 5. More specifically, the CPU 101 waits until the storage unit 306 stores a FAX reception image. When the FAX reception image is stored (YES in step S6-001), the processing proceeds to step S6-002.

In step S6-002, the CPU 101 determines whether the dew condensation elimination processing flag is ON. If the dew condensation elimination processing flag is OFF (NO in step S6-002), the processing proceeds to step S6-003. On the other hand, if the dew condensation elimination processing flag is ON (YES in step S6-002), the processing proceeds to step S6-005.

In step S6-003, the CPU 101 determines whether the recording unit 113 is in a printable state. For example, the recording unit 113 is determined to be in a non-printable state (printing disabled) when there is no sheet or toner, or when paper jam occurs during printing. If the recording unit 113 is not in the printing disabled state (NO in step S6-003), the processing proceeds to step S6-004. On the other hand, if the recording unit 113 is in the printing disabled state (YES in step S6-003), the processing proceeds to step S6-005.

In step S6-004, the FAX reception image is printed as will be described in detail below. Then, the processing returns to step S6-001.

In step S6-005, the CPU 101 requests the UI 302 to display a message, indicating that the FAX reception image is stored in the memory (the eMMC 109) without being printed, on the display unit 105.

When the dew condensation elimination processing flag is ON in step S6-002, the dew condensation is assumed to have occurred in the recording unit 113. The printing of the FAX image conducted in this situation might result in erroneous printing or printing an image with a low image quality. Thus, in such a condition, the FAX image is stored in the memory without being printed. When the predetermined time S2 elapses, the dew condensation elimination processing is terminated and thus the dew condensation elimination processing flag is turned OFF, so that the result of the determination in step S6-002 becomes NO. Thus, the FAX image stored in the memory can be printed in step S6-004.

Figure 7:
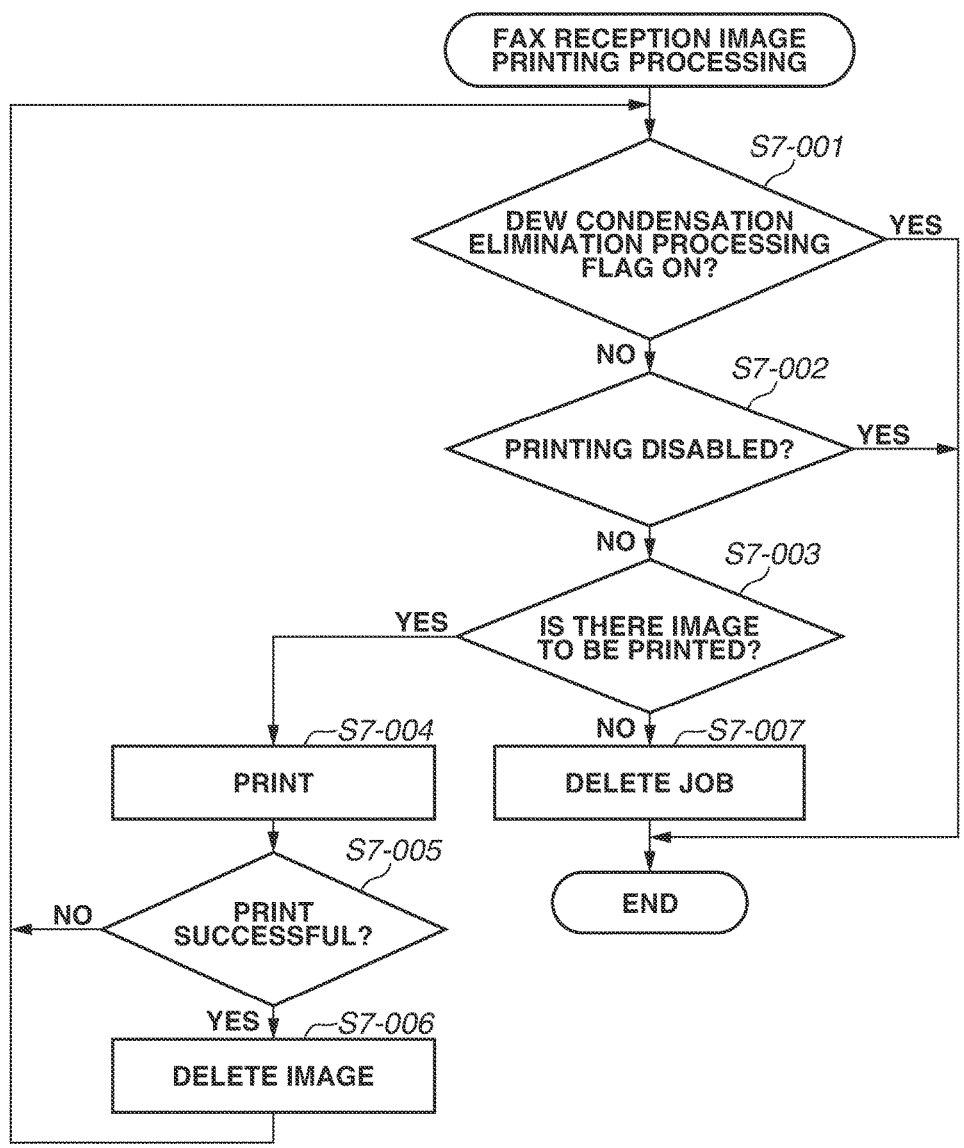
FIG. 7 is a flowchart illustrating an example of FAX reception image printing processing according to the first embodiment.

FIG. 7 is a flowchart illustrating an example of FAX reception image printing processing according to the first embodiment. Steps in the flowchart illustrated in FIG. 7 are implemented by the CPU 101 through execution of the main program loaded on the RAM 103. More specifically, the flowchart is executed by part of programs that constitute the print unit 305.

In step S7-001, the CPU 101 determines whether the dew condensation elimination processing flag is ON. If the dew condensation elimination processing flag is OFF (NO in step S7-001), the processing proceeds to step S7-002. If the dew condensation elimination processing flag is ON (YES in step S7-001), the processing in this flowchart is terminated.

In step S7-002, the CPU 101 determines whether the recording unit 113 is in the printable state. If the recording unit 113 is not in the printing disabled state (NO in step S7-002), the processing proceeds to step S7-003. On the other hand, if the recording unit 113 is in the printing disabled state (YES in step S7-002), the processing in the flowchart is terminated.

In step S7-003, the CPU 101 determines whether image data to be printed is stored in the eMMC 109. If the image data to be printed is stored (YES in step S7-003), the processing proceeds to step S7-004. On the other hand, if the image data to be printed is not stored (NO in step S7-003), the processing proceeds to step S7-007.

In step S7-004, the CPU 101 prints the image to be printed. More specifically, the CPU 101 reads the image data from the eMMC 109, and issues a command related to the printing and the read image data to the recording unit 113 via the recording controller 112 to cause the recording unit 113 to print the image.

In step S7-005, the CPU 101 determines whether the printing in step S7-004 was successful. If the printing was successful (YES in step S7-005), the processing proceeds to step S7-006. In step S7-006, the CPU 101 deletes the printed image data from the eMMC 109. On the other hand, when the printing was not successful (NO in step S7-005), the processing returns to step S7-001, and the CPU 101 attempts to print the image data again.

If the CPU 101 determines that the image data to be printed is not stored in step S7-003 (NO in step S7-003), the processing proceeds to step S7-007. In step S7-007, the CPU 101 deletes management information on the FAX reception job from the eMMC 109, and terminates the FAX reception job printing processing.

Figure 8:
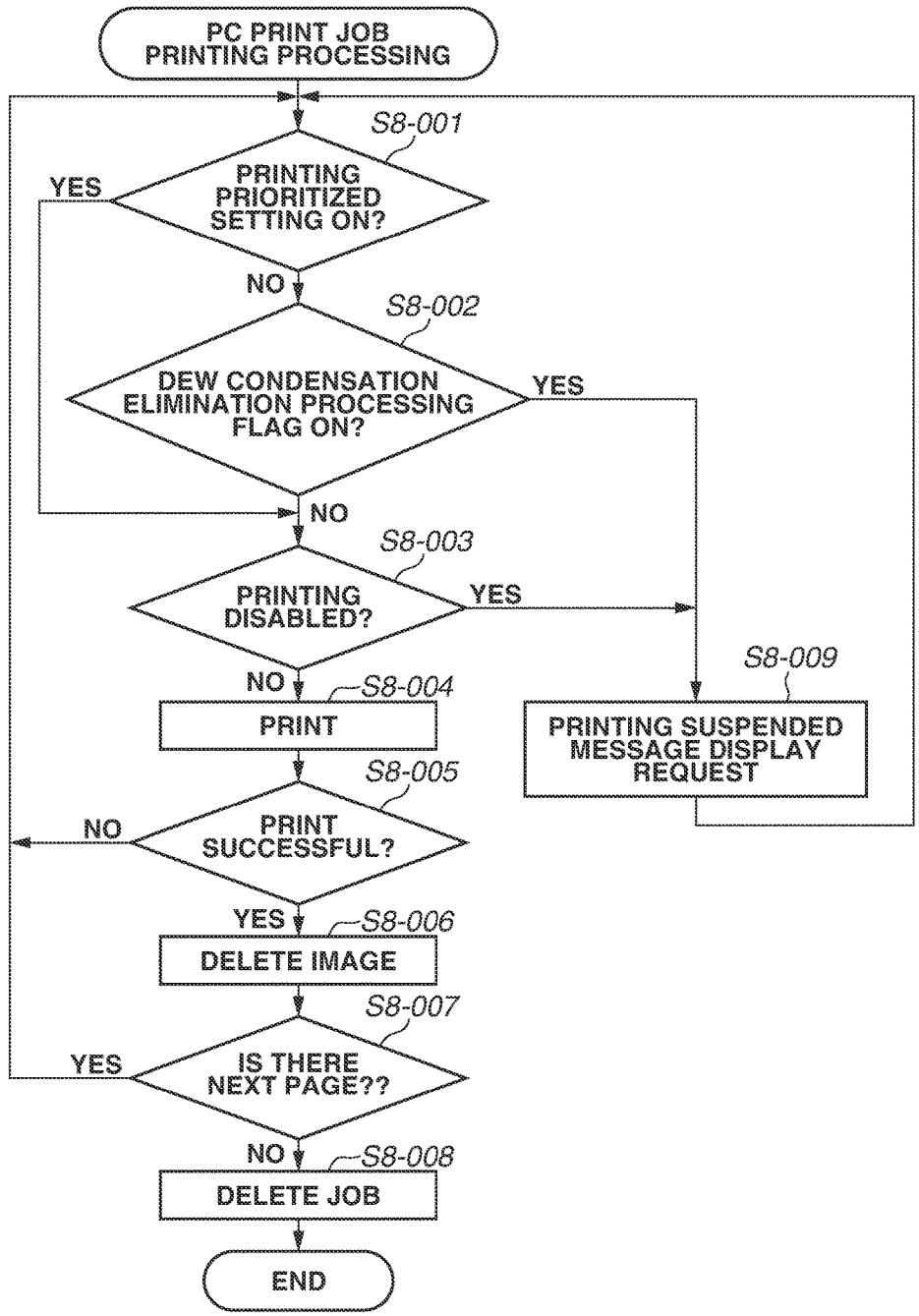
FIG. 8 is a flowchart illustrating an example of personal computer (PC) print job printing processing according to the first embodiment.

FIG. 8 is a flowchart illustrating an example of personal computer (PC) print job printing processing according to the first embodiment. Steps in the flowchart illustrated in FIG. 8 are implemented by the CPU 101 through execution of the main program loaded on the RAM 103. More specifically, the flowchart is executed by part of programs that constitute the print unit 305.

The term PC print job refers to receiving print data transmitted from a PC, which is an example of an information processing device outside the MFP 10, via the NIC 117 and performing printing based on the received print data.

The MFP 10 according to the first embodiment may be set in advance to permit or not to permit the printing based on the PC print job while the dew condensation elimination processing in the recording unit 113 is in execution. Such a setting is referred to as printing prioritized setting. The printing prioritized setting is turn ON and OFF by an instruction from a user or an administrator of the MFP 10 via the operation unit 107, and the resultant setting is stored in the eMMC 109. Even when the printing prioritized setting is ON, the printing of the FAX reception image is not permitted while the dew condensation elimination processing is in execution. Thus, the printing prioritized setting is irrelevant to the processing in the flowchart illustrated in FIG. 7 described above.

First of all, in step S8-001 the CPU 101 checks whether the printing prioritized setting is ON or OFF. If the printing prioritized setting is OFF (NO in step S8-001), the processing proceeds to step S8-002. On the other hand, if the printing prioritized setting is ON (YES in step S8-001), the processing skips step S8-002 and proceeds to step S8-003. Thus, the printing based on the PC print job is executed even when the dew condensation elimination processing flag is ON, if the printing prioritized setting is ON. If the dew condensation elimination processing flag is ON, the dew condensation elimination processing is executed in the recording unit 113. However, this does not necessarily mean that the dew condensation is occurring in the MFP 10. Even when the printing based on the PC print job results in an image with a low image quality due to the dew condensation in the MFP 10, the user can issue the print instruction again from the PC. Thus, the user who wants to avoid suspension of the printing may turn ON the printing prioritized setting.

In step S8-002, the CPU 101 determines whether the dew condensation elimination processing flag is ON. If the dew condensation elimination processing flag is OFF (NO in step S8-002), the processing proceeds to step S8-003. On the other hand, if the dew condensation elimination processing flag is ON (YES in step S8-002), the processing proceeds to step S8-009.

In step S8-003, the CPU 101 determines whether the recording unit 113 is in the printable state. If the recording unit 113 is not in the printing disabled state (NO in step S8-003), the processing proceeds to step S8-004. On the other hand, if the recording unit 113 is in the printing disabled state (YES in step S8-003), the processing proceeds to step S8-009.

In step S8-004, the CPU 101 prints image data of a single page to be printed. Then, in step S8-005, the CPU 101 determines whether the printing in step S8-004 was successful. If the printing was successful (YES in step S8-005), the processing proceeds to step S8-006. On the other hand, if the printing was not successful (NO in step S8-005), the processing returns to step S8-001.

In step S8-006, the CPU 101 deletes the image data of the page that has been successfully printed from the eMMC 109.

In step S8-007, the CPU 101 determines whether there is image data of the next single page to be printed. When there is the image data of the next single page to be printed (YES in step S8-007), the processing returns to step S8-001, and the image data of the next single page is printed. On the other hand, if there is no image data of the next single page to be printed (NO in step S8-007), the processing proceeds to step S8-008.

In step S8-008, the CPU 101 deletes management information of the PC print job, with the pages that have all been successfully printed, from the eMMC 109. Then, the PC print job printing processing is terminated.

In step S8-009, the CPU 101 requests the UI 302 to display a message indicating that the printing for the PC print job is suspended due to the dew condensation or because the printing is disabled, on the display unit 105.

In the first embodiment described above, the dew condensation is likely to have occurred in the MFP 10 when the MFP 10 is executing the dew condensation elimination processing. Thus, the image forming processing based on the FAX reception is restricted while the dew condensation elimination processing is in execution, and the received FAX image data is stored. Thus, printing that would only result in a low image quality is prevented from being meaninglessly performed. At the same time, the image data received via FAX is prevented from being lost while the dew condensation is occurring.

The MFP 10 may also be set in such a manner that a similar control is performed for the PC print job as that for the FAX reception job.

The processing in the flowchart illustrated in FIG. 8 may be applied to copy processing in which the recording unit 113 prints an image on a document read by the reading unit 111.

In the first embodiment, the same processing is executed in the case where the dew condensation elimination processing flag is ON and in the case where the printing is disabled. Alternatively, the processing to be executed may be different between the case where the dew condensation elimination processing flag is ON and the case where the printing is disabled.

Figure 9:
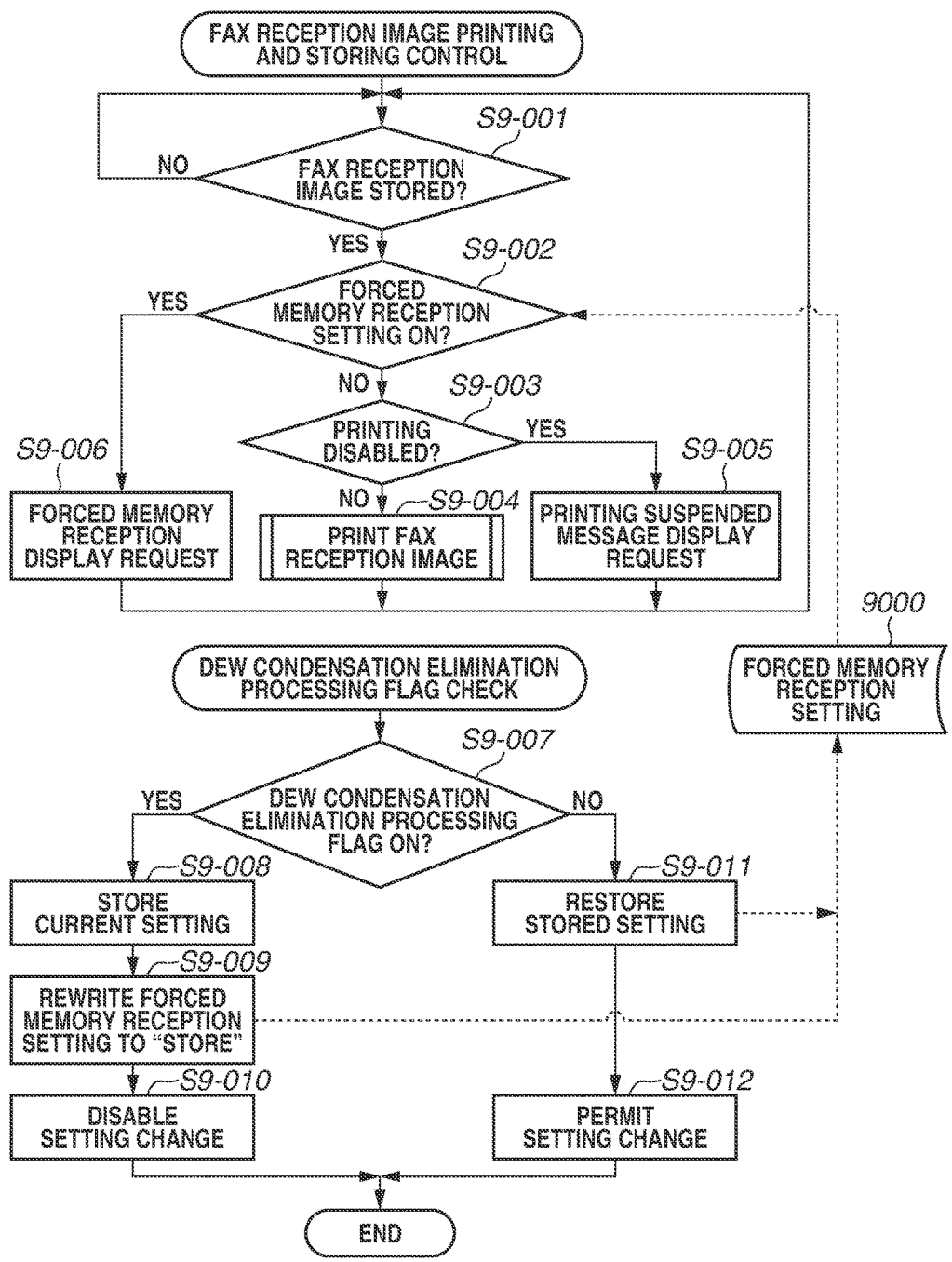
FIG. 9 is a flowchart illustrating an example of FAX reception image printing and storing control and dew condensation elimination processing flag checking processing according to a second embodiment.

FIG. 9 is a flowchart illustrating an example of FAX reception image printing and storing control and dew condensation elimination processing flag checking processing according to a second embodiment. The MFP 10 according to the second embodiment has the same hardware and software configurations as those illustrated in FIGS. 1 to 3. The dew condensation determination processing and the dew condensation elimination processing executed in the recording unit 113 are the same as those illustrated in FIG. 4.

Steps in the flowchart illustrated in FIG. 9 are implemented by the CPU 101 through execution of the main program loaded on the RAM 103.

In the flowchart illustrated in FIG. 9, steps S9-001, S9-003, S9-004, and S9-005 are respectively the same as steps S6-001, S6-003, S6-004, and S6-005 in the flowchart illustrated in FIG. 6.

The MFP 10 according to the second embodiment may store a setting (forced memory reception setting) 9000, with which a FAX reception image is stored in the memory without being printed, in the eMMC 109. In step S9-002, the CPU 101 checks whether the forced memory reception setting 9000 is ON. If the forced memory reception setting 9000 is ON, the processing proceeds to step S9-006. On the other hand, if the forced memory reception setting is OFF, the processing proceeds to step S9-003.

In step S9-006, the CPU 101 stores the FAX reception image in the eMMC 109 without printing the image, and requests the UI 302 to display the message indicating that the image is stored in the memory, on the display unit 105. Then, the processing returns to step S9-001.

The dew condensation elimination processing flag checking processing includes steps S9-007 to S9-012.

First of all, in step S9-007, the CPU 101 checks whether the dew condensation elimination processing flag is ON. If the dew condensation elimination processing flag is ON (YES in step S9-007), the processing proceeds to step S9-008. On the other hand, if the dew condensation elimination processing flag is OFF (NO in step S9-007), the processing proceeds to step S9-011.

In step S9-008, the CPU 101 temporarily stores the current setting value of the forced memory reception setting 9000 in a predetermined area in the eMMC 109.

Then, in step S9-009, the CPU 101 rewrites the setting of the forced memory reception setting 9000 to a value indicating "store".

Then, in step S9-010, the CPU 101 requests the UI 302 to disable setting change via the operation unit 107. In response to the request, the UI 302 grays out a menu display for setting the forced memory reception setting 9000 so that the user cannot change the setting.

In step S9-011, the CPU 101 returns the setting value of the forced memory reception setting 9000 to what has been temporarily stored in step S9-008.

Then, in step S9-012, the CPU 101 requests the UI 302 to permit the setting change on the operation unit 107.

According to the second embodiment described above, an effect similar to that in the first embodiment can be obtained, even when the state where the dew condensation elimination flag is ON is not regarded to be the same as the printing disabled state.

The FAX reception image forcibly received by the memory may be made viewable on the display unit 105 or a web browser on a PC connected via the NIC 117, so that a usability can be improved.

In an example described in a third embodiment, the MFP 10 that has transitioned to a power saving mode returns to a normal power mode and measures the environmental temperature, when an environmental temperature measurement timing arrives. In the power saving mode, power supply to at least the recording controller 112 and the recording unit 113 is stopped, so that lower power consumption is achieved in the apparatus as a whole, compared with the normal power mode. In an example described in the present embodiment, even in the power saving mode, the CPU 101 receives power supply and thus can control the recording unit 113 so that the dew condensation determination processing can be executed. Alternatively, the power supply to the CPU 101 may be stopped in the power saving mode. In such a configuration, the CPU 101 may be periodically woken up (that is, may transition to the power supplied state) by a timer, and execute the following processing.

In the power saving mode, the power supply to the recording unit 113 stops, and thus the temperature sensor 207 in the recording unit 113 cannot measure the environmental temperature. Thus, the CPU 101 that can operate in the power saving mode controls the recording controller 112 and the recording unit 113 in such a manner that the recording unit 113 recovers from the power saving mode at a predetermined timing. The recording unit 113 that has recovered executes the dew condensation determination processing described with reference to FIG. 4. If a result of the dew condensation determination processing indicates that the dew condensation elimination processing needs to be executed (Yes in step S4-004), the dew condensation elimination processing is executed. If it is determined that the processing needs not to be executed (No in step S4-004), the recording unit 113 returns to the power saving mode.

Figure 10:
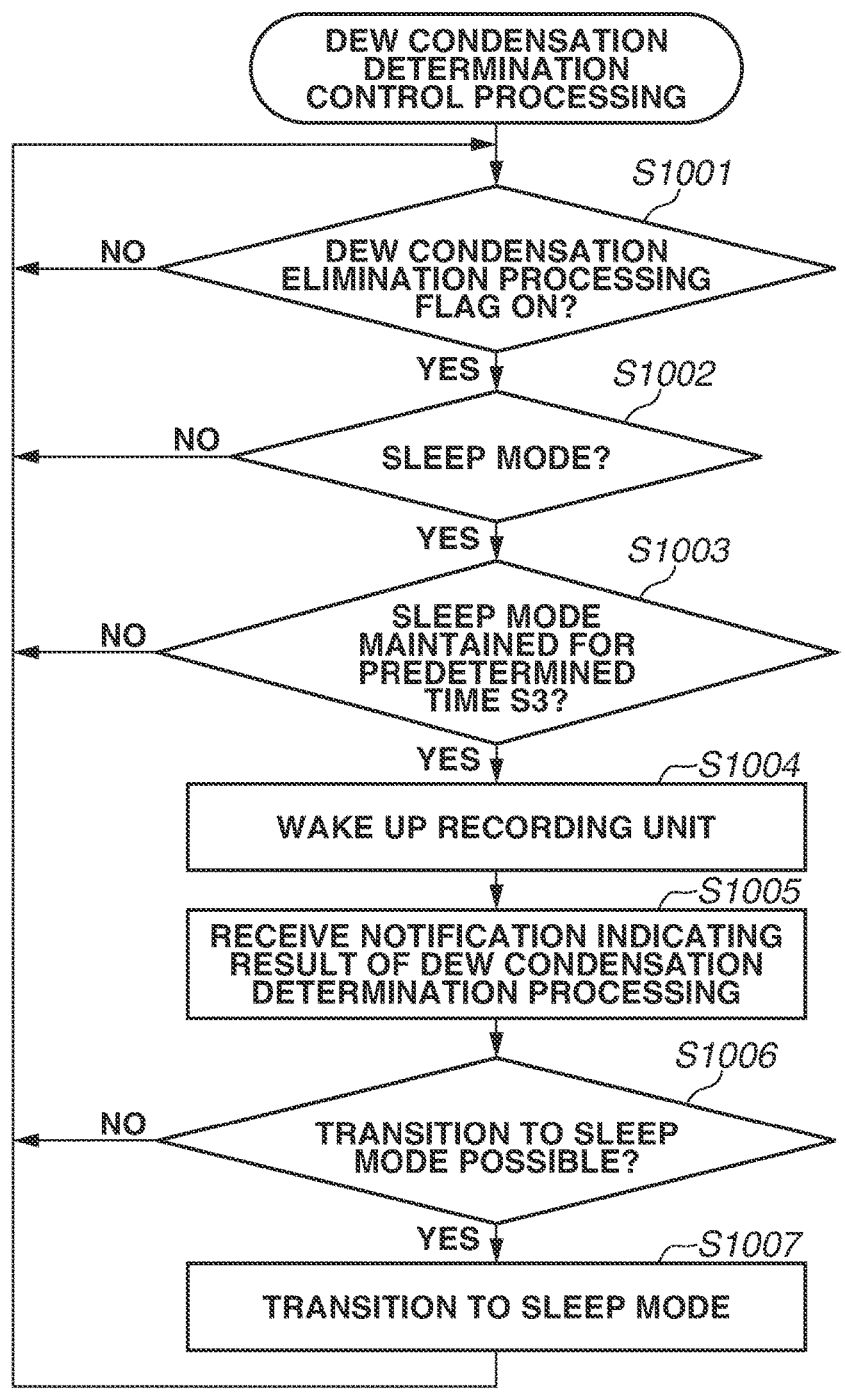
FIG. 10 is a flowchart illustrating an example of dew condensation determination processing according to a third embodiment.

Dew condensation determination processing according to the present embodiment is described with reference to FIG. 10. The processing illustrated in FIG. 10 for the recording unit 113 is implemented by the CPU 101 through execution of the program stored in the ROM 102.

In step S1001, the CPU 101 determines whether the dew condensation elimination processing flag is ON. The processing in step S1001 is repeated as long as the dew condensation elimination processing flag is OFF (NO in step S1001). On the other hand, when the dew condensation elimination processing flag is ON (YES in step S1001), the processing proceeds to step S1002. In step S1002, the CPU 101 determines whether the MFP 10 is in the sleep mode. If the MFP 10 is not in the sleep mode (NO in step S1002), the processing returns to step S1001. If the MFP 10 is in the sleep mode (YES in step S1002), the processing returns to step S1003. In step S1003, the CPU 101 determines whether the sleep mode has been maintained for a predetermined time S3. The predetermined time S3 according to the present embodiment may be, for example, longer than the predetermined time S1 illustrated in FIG. 4. If the sleep mode has not been maintained for the predetermined time S3 yet (NO in step S1003), the processing returns to step S1001. On the other hand, when the sleep mode has been maintained for the predetermined time S3 (YES in step S1003), the processing proceeds to step S1004. In step S1004, the CPU 101 wakes the recording unit 113 up from the sleep mode. Upon waking up from the sleep mode, the recording unit 113 executes the dew condensation determination processing and the dew condensation elimination processing described with reference to FIG. 4.

When the dew condensation determination processing is executed in the recording unit 113, in step S1005, the CPU 101 receives a notification indicating the result of the dew condensation determination processing from the recording unit 113. Then, in step S1006, the CPU 101 determines whether the transition to the sleep mode is possible, based on the received notification. When a sleep mode transition condition, at least including reception of a notification from the recording unit 113 indicating that the dew condensation is not generated, is satisfied, the CPU 101 according to the present embodiment determines that the transition to the sleep mode is possible. On the other hand, when the dew condensation elimination processing described above with reference to FIG. 4 is executed due to the occurrence of the dew condensation, the CPU 101 determines that the transition to the sleep mode is not possible. When the CPU 101 determines that the transition to the sleep mode is not possible (NO in step S1006), the processing returns to step S1001. When the CPU 101 determines that the transition to the sleep mode is possible (YES in step S1006), the processing proceeds to step S1007. In step S1007, the CPU 101 causes the MFP 10 to transition to the sleep mode, and then the processing returns to step S1001.

In an example described in the present embodiment, the result of the dew condensation determination processing is received in step S1005. Alternatively, this processing may be omitted. If the dew condensation elimination processing is determined to be required as a result of the dew condensation determination processing and thus is executed, an operation such as rotation of the fan 209 starts. Accordingly, the CPU 101 can determine that the transition to the sleep mode is not possible in step S1006. The CPU 101 may determine that the transition to the sleep mode is possible in step S1006 and cause the MFP 10 to transition to the sleep mode in step S1007, when a predetermined time elapses without such operation as rotation of the fan 209.

Figure 11:
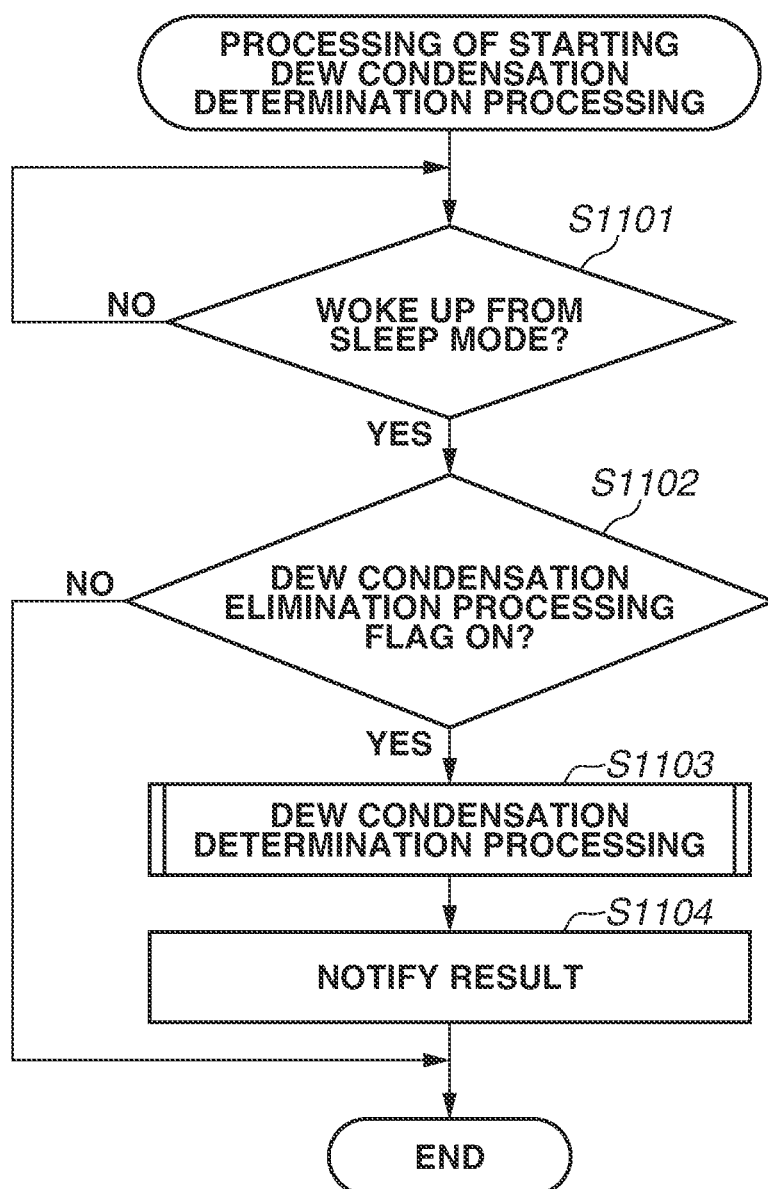
FIG. 11 is a flowchart illustrating an example of processing of starting the dew condensation determination processing according to the third embodiment.

Next, processing executed by the CPU 200 when the recording unit 113 wakes up from the sleep mode is described with reference to FIG. 11. In step S1101, the CPU 200 determines whether the recording unit 113 has woken up from the sleep mode. If the recording unit 113 has woken up from the sleep mode (Yes in step S1101), the processing proceeds to step S1102. In step S1102, the CPU 200 determines whether the dew condensation elimination processing flag is ON. If the dew condensation elimination processing flag is OFF (NO in step S1002), the processing is terminated. On the other hand, if the dew condensation elimination processing flag is ON (YES in step S1002), the processing proceeds to step S1003. In step S1103, the CPU 200 executes the dew condensation determination processing described with reference to FIG. 4. Then, in step S1104, the CPU 200 notifies the CPU 101 of the result of the dew condensation determination processing.

According to the present embodiment, the environmental temperature in the MFP 10 can be measured periodically even when the MFP 10 is in the sleep mode, and the dew condensation elimination processing can be started when it is determined that the dew condensation has occurred.

In the examples described in the first and the second embodiments, the forced memory reception is performed in the FAX reception printing and storing control, when the dew condensation has occurred. In an example described in this fourth embodiment, the storing of a FAX reception image in the memory without printing the image is not based on the forced memory reception setting. Instead, the FAX reception image is stored in the memory without being printed when it is determined that the MFP 10 is in the printing disabled state including the state where the dew condensation elimination processing is in execution. In the present embodiment, the CPU 101 executes processing illustrated in FIG. 12, instead of the processing illustrated in FIG. 6 and FIG. 9. The other configuration and processing are the same as those described in the first or the second embodiment, and thus the description thereof will be omitted.

The processing in FIG. 12 is implemented by the CPU 101 through execution of a program stored in the ROM 102. In step S1201, the CPU 101 determines whether a FAX reception image is stored. The processing in step S1201 is repeated as long as no FAX reception image is stored (NO in step S1201). On the other hand, when the FAX reception image is stored (YES in step S1202), the processing proceeds to step S1202. In step S1202, the CPU 101 determines whether the MFP 10 is in the printing disabled state. The printing disabled state according to the present embodiment includes the state where the dew condensation elimination processing is in process with the fan 209 rotating. If the MFP 10 is not in the printing disabled state (NO in step S1202), the processing proceeds to step S1203. In step S1203, the CPU 101 prints the FAX reception image. The detail of the FAX reception image printing processing is the same as that described in FIG. 5, and thus the description thereof will be omitted. When the MFP 10 is in the printing disabled state (YES in step S1202), the processing proceeds to step S1204. In step S1204, the CPU 101 performs control in such a manner that the received image is stored in the memory without being printed. Then, in step S1205, the CPU 101 requests the display unit 105 to display the message indicating that the image is stored without being printed. Then, the processing returns to step S1201.

Also with the processing described above, the FAX reception image can be prevented from being printed when the dew condensation elimination processing is in execution due to the occurrence of the dew condensation. Thus, printing that would only result in a low image quality is prevented from being meaninglessly performed. At the same time, the image data received via FAX is prevented from being lost while the dew condensation is occurring. Furthermore, the effect described above can be obtained without employing the management involving checking whether the forced memory reception setting flag is ON or OFF as in the first and the second embodiments.

In the configurations according to the first and the second embodiments, the FAX reception image is not printed when the dew condensation elimination processing flag is ON. Alternatively, with a configuration described below, the dew condensation elimination processing can be executed without the risk of losing the reception data while the dew condensation is occurring, without suspending the printing. More specifically, step S6-002 may be deleted in FIG. 6, and step S7-001 in FIG. 7 may be moved to between steps S7-005 and S7-006 and to before step S7-007. Furthermore, the processing in step S7-003 may be changed to processing of determining whether a page to be printed is remaining. Thus, the FAX reception image printing processing is executed even when the dew condensation elimination processing flag is ON. Also with this configuration, the dew condensation elimination processing can be executed without the risk of losing the reception data while the dew condensation is occurring. Still, this configuration is not free of a risk of printing an image with a low image quality.

In the recording unit dew condensation determination processing, illustrated in FIG. 4, according to the first embodiment, whether the dew condensation is occurring is determined based on an absolute temperature obtained from the temperature sensor 207 and an amount of change per unit time. The dew condensation determination processing is not limited to this. For example, the recording unit 113 illustrated in FIG. 2 may further include a humidity sensor. More accurate dew condensation determination processing can be achieved with estimation based on measurement results from the temperature sensor 207 and the humidity sensor. Alternatively, whether the dew condensation has occurred may be determined based on a charged state of the photosensitive drum 210.

In the configurations according to the first and the second embodiments, the dew condensation determination processing is executed in any environment. Generally, the dew condensation occurs in a limited environment with a low temperature. Thus, for example, a user environment may be selectable through navigation by the main program at the timing when the MFP 10 is installed, and the recording unit may execute the dew condensation determination processing only when the MFP 10 is used in a location with a low temperature.

The dew condensation elimination processing according to the embodiments described above is achieved with the full speed rotation of the fan 209 of the image forming unit 205 of the recording unit 113. However, the dew condensation elimination processing is not limited to this. For example, the image forming unit 205 may include a dew condensation prevention heater, and the dew condensation may be eliminated with this heater heated for a predetermined period of time.

Other Embodiments

Embodiment(s) can also be realized by a computer of a system or apparatus that reads out and executes computer executable instructions (e.g., one or more programs)

recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2016-145741, filed Jul. 25, 2016, and No. 2016-247180, filed Dec. 20, 2016, which are hereby incorporated by reference herein in their entirety.

What is claimed is:

1. An image forming apparatus capable of receiving fax data, the image forming apparatus comprising:
an image forming device configured to form an image on a sheet, wherein the image forming device is capable of executing a first image forming processing in which image forming based on fax data is started in response to receipt of the fax data and executing a second image forming processing different from the first image forming processing;
a fan configured to be driven for air ventilation;
a sensor configured to acquire temperature information; and
at least one controller configured to function as:
a unit configured to enable a prohibition mode of the first image forming processing at least based on the temperature information, wherein, in the prohibition mode, execution of the first image forming processing is prohibited, execution of the second image forming processing is permitted and the fan is driven.

2. The image forming apparatus according to claim 1, wherein the controller is configured to store, in a storage, fax data received during the prohibition mode.

3. The image forming apparatus according to claim 2, wherein, in response to end of the prohibition mode, the controller is configured to cause the image forming device to execute image forming based on the fax data stored in the storage.

4. The image forming apparatus according to claim 2, wherein the controller is configured to output information for displaying the fax data stored in the storage.

5. The image forming apparatus according to claim 1, wherein the controller is configured to delete fax data in response to completion of image forming based on the fax data.

6. The image forming apparatus according to claim 1, wherein the controller is configured to cause the fan to execute predetermined driving processing, based on a temperature change in the temperature information satisfying a predetermined condition, and
wherein the predetermined driving processing is executed during the prohibition mode.

7. The image forming apparatus according to claim 6, wherein the fan is driven at a rotation speed equal to or higher than a predetermined value in the predetermined driving processing.

8. The image forming apparatus according to claim 6, wherein the predetermined driving processing is executed during a prohibition mode of the first image forming processing.

9. The image forming apparatus according to claim 6, wherein the predetermined condition at least includes a condition that a temperature indicated by the temperature information is equal to or less than a predetermined temperature.

10. The image forming apparatus according to claim 6, wherein the predetermined driving processing executed by the fan is dew condensation elimination processing configured to eliminate the dew condensation in the image forming apparatus.

11. The image forming apparatus according to claim 10, wherein the fan is configured to discharge air inside the image forming apparatus so that an airflow is created in the image forming apparatus, and
wherein the dew condensation elimination processing is executed during a printing disabled state by a predetermined speed rotation of the fan.

12. The image forming apparatus according to claim 11, wherein the predetermined speed rotation of the fan is for a predetermined time and the fan is rotate at a speed other than the full speed.

13. The image forming apparatus according to claim 12, wherein, after the predetermined time rotation of the fan has elapsed, the rotation of the fan is stopped or, in a case where the fan was rotating at a preprocessing predetermined speed before the dew condensation elimination processing, the rotation of the fan is returned to the preprocessing predetermined speed.

14. The image forming apparatus according to claim 10, wherein the dew condensation elimination processing is executed by heating a dew condensation prevention heater for a predetermined period of time.

15. The image forming apparatus according to claim 14, wherein, when executing the dew condensation elimination processing, the dew condensation prevention heater is heated for a predetermined period of time.

16. The image forming apparatus according to claim 1, wherein the second image forming processing includes processing for executing a copy job with which an image is formed based on an image scanned by a scanner.

17. The image forming apparatus according to claim 1, wherein the second image forming processing includes processing for executing a print job with which an image is formed based on received print data.

18. The image forming apparatus according to claim 1, wherein the controller is further configured to output a notification of condensation.

19. A method for controlling an image forming apparatus capable of receiving fax data, wherein the image forming apparatus includes an image forming device configured to form an image on a sheet, wherein the image forming device is capable of executing a first image forming processing in which image forming based on fax data is started in response to receipt of the fax data and executing a second image forming processing different from the first image forming processing, a fan configured to be driven for air ventilation, and a sensor configured to acquire temperature information, the method comprising:

enabling a prohibition mode of the first image forming processing at least based on the temperature information; and in the prohibition mode, prohibiting execution of the first image forming processing, permitting execution of the second image forming processing, and driving the fan.

20. A non-transitory computer-readable storage medium storing a program to cause a controller to perform a method for controlling an image forming apparatus capable of receiving fax data, wherein the image forming apparatus includes an image forming device configured to form an image on a sheet, wherein the image forming device is capable of executing a first image forming processing in which image forming based on fax data is started in response to receipt of the fax data and executing a second image forming processing different from the first image forming processing, a fan configured to be driven for air ventilation, and a sensor configured to acquire temperature information, the method comprising:

enabling a prohibition mode of the first image forming processing at least based on the temperature information; and in the prohibition mode, prohibiting execution of the first image forming processing, permitting execution of the second image forming processing, and driving the fan.

* * * * *